United States Patent
Nagata et al.

(10) Patent No.: US 7,023,496 B2
(45) Date of Patent: Apr. 4, 2006

(54) MOVING PICTURE DECODING DISPLAY APPARATUS AND METHOD FOR CONTROLLING A VIDEO SIGNAL'S CONTRAST AND BRIGHTNESS WHEN A VIDEO SIGNAL UPDATE IS DETECTED

(75) Inventors: Hideki Nagata, Matto (JP); Tadashi Kayada, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 551 days.

(21) Appl. No.: 10/275,575

(22) PCT Filed: Mar. 8, 2002

(86) PCT No.: PCT/JP02/02166

§ 371 (c)(1),
(2), (4) Date: Nov. 7, 2002

(87) PCT Pub. No.: WO02/073978

PCT Pub. Date: Sep. 19, 2002

(65) Prior Publication Data

US 2003/0076886 A1   Apr. 24, 2003

(30) Foreign Application Priority Data

Mar. 9, 2001   (JP) ............................... 2001-67308

(51) Int. Cl.
*H04N 5/72*   (2006.01)
*H04N 9/67*   (2006.01)
*H04N 9/72*   (2006.01)

(52) U.S. Cl. ...................... 348/673; 348/453; 348/659; 348/730; 348/838; 345/604

(58) Field of Classification Search ........ 348/659–661, 348/705–706, 453, 673, 730, 838; 345/604; H04N 5/72, H04N 9/67, 9/77
See application file for complete search history.

(56) References Cited

U.S. PATENT DOCUMENTS 5,402,183 A * 3/1995 Tanaka ....................... 348/705

(Continued)

FOREIGN PATENT DOCUMENTS

JP   05053541   3/1993

(Continued)

*Primary Examiner*—Brian P. Yenke
(74) *Attorney, Agent, or Firm*—Stevens, Davis, Miller & Mosher, LLP (57) ABSTRACT

In a moving picture decoding display apparatus and moving picture decoding display method according to the present invention, moving picture decoder 101 decodes a moving picture signal, RGB matrix manipulation section 103 converts the decoded video signal in YCbCr format into a video signal in RGB format, contrast/brightness adjusting section 104 adjusts the contrast and brightness of the video signal in RGB format, and liquid crystal display module section 110 displays the adjusted video signal on liquid crystal panel 109. At this point, operation control section 105 switches on and off the operation of RGB matrix manipulation section 103 and contrast/brightness adjusting section 104 corresponding to the actual frame rate in moving picture decoder 101, and only when the operation is "on", the section 105 controls so that the video signal from contrast/brightness adjusting section 104 is stored in video RAM 107 in liquid crystal display module section 110. Thus, since the operation of required video signal processing is switched on and off based on the actual frame rate, it is possible to suppress the power consumption in the entire apparatus.

5 Claims, 9 Drawing Sheets

U.S. PATENT DOCUMENTS

| | | | | |
|---|---|---|---|---|
| 5,808,693 A | * | 9/1998 | Yamashita et al. | 348/554 |
| 6,057,889 A | * | 5/2000 | Reitmeier et al. | 348/555 |
| 6,078,361 A | * | 6/2000 | Reddy | 348/558 |
| 6,118,486 A | * | 9/2000 | Reitmeier | 348/441 |
| 6,335,761 B1 | * | 1/2002 | Glen et al. | 348/557 |
| 6,346,972 B1 | * | 2/2002 | Kim | 348/569 |
| 6,441,857 B1 | * | 8/2002 | Wicker et al. | 348/441 |
| 6,549,240 B1 | * | 4/2003 | Reitmeier | 348/459 |
| 6,573,905 B1 | * | 6/2003 | MacInnis et al. | 345/629 |
| 6,593,975 B1 | * | 7/2003 | Oh | 348/730 |
| 6,621,526 B1 | * | 9/2003 | Yamagishi | 348/659 |
| 6,819,305 B1 | * | 11/2004 | Wicker | 345/3.1 |
| 2001/0015771 A1 | * | 8/2001 | Kishimoto et al. | 348/705 |
| 2003/0030618 A1 | * | 2/2003 | Jones | 345/102 |

FOREIGN PATENT DOCUMENTS

| | | |
|---|---|---|
| JP | 07298112 | 11/1995 |
| JP | 09212134 | 8/1997 |
| JP | 11164319 | 6/1999 |
| JP | 2000032312 | 1/2000 |
| JP | 2000284744 | 10/2000 |

* cited by examiner

MOVING PICTURE DECODING DISPLAY APPARATUS AND METHOD FOR CONTROLLING A VIDEO SIGNAL'S CONTRAST AND BRIGHTNESS WHEN A VIDEO SIGNAL UPDATE IS DETECTED

TECHNICAL FIELD

The present invention relates to a moving picture decoding display apparatus and moving picture decoding display method which are installed onto a mobile station apparatus such as a cellular telephone or an information communication terminal apparatus provided with functions of communications and computer in a mobile communication system, and which convert video signals including brightness signal Y and color-difference signals Cb and Cr from a moving picture decoder into video signals in primary-color signal format composed of R (Red), G (Green) and B (Blue) to display moving pictures.

BACKGROUND ART

In battery-powered portable terminal apparatuses, liquid crystal display apparatuses have been proposed which reduce power consumption. An example is disclosed in Japanese Laid-Open Patent Publication HEI5-53541 in which the access to a video memory is monitored for a predetermined time to control a driving section of a display apparatus, or in Japanese Laid-Open Patent Publication HEI9-212134 in which updated part of display data is only transferred to a display memory. A conventional moving picture decoding display apparatus that is a liquid crystal display apparatus will be described with reference to FIG. 1.

Figure 1:
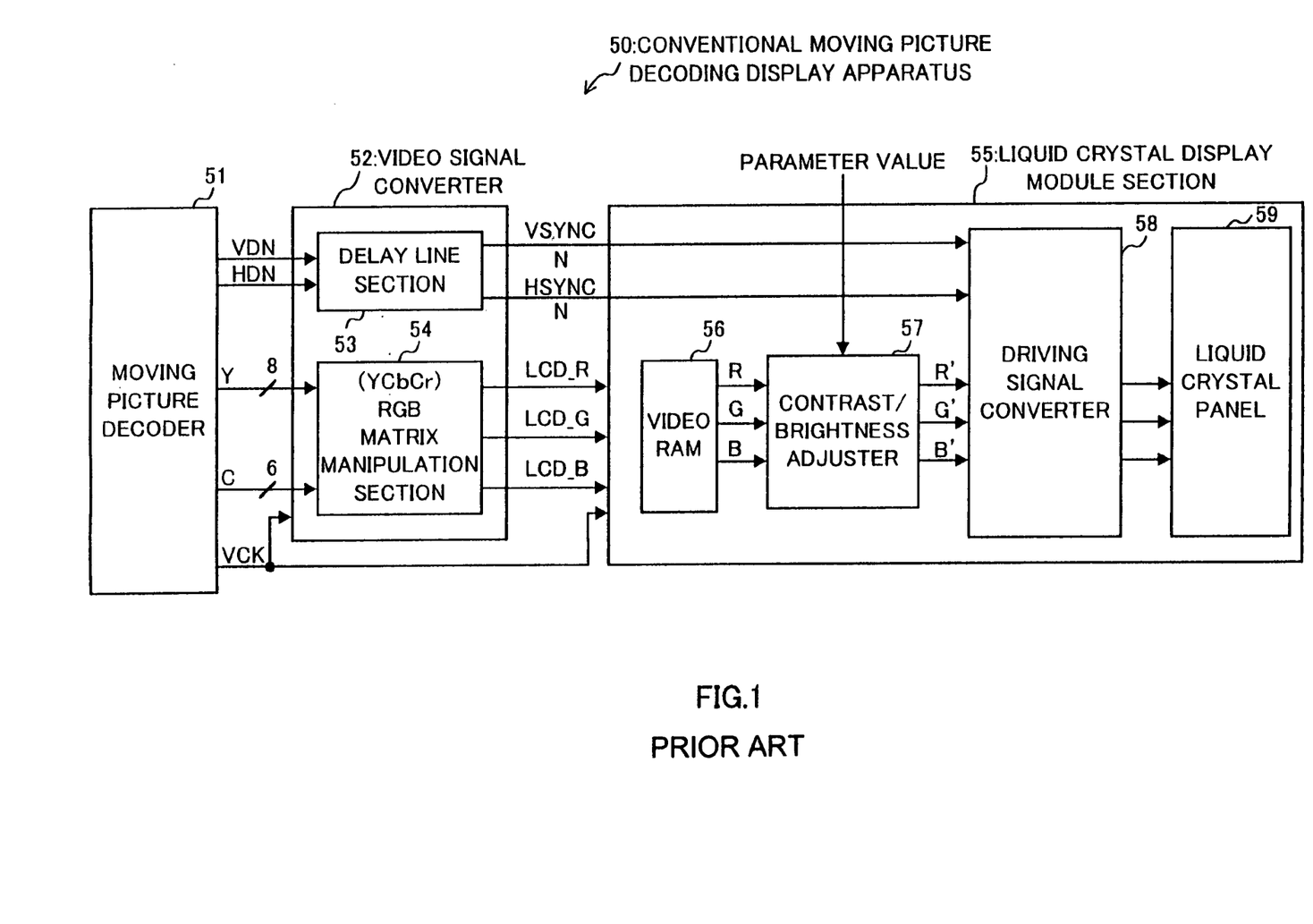
FIG. 1 is a block diagram illustrating a configuration of a conventional moving picture decoding display apparatus.

FIG. 1 is a block diagram illustrating a configuration of a conventional moving picture decoding display apparatus. Generally, moving picture coding/decoding schemes such as ITU-T H.263 and MPEG use image formats such as CIF (Common Intermediate Format) and QCIF (Quarter CIF). Herein, as an example, a case is explained that the image format is of CIF4:2:2 (Valid display area: 352 pixels×288 scanning lines).

Moving picture decoding display apparatus 50 illustrated in FIG. 1 is provided with moving picture decoder 51, video signal converter 52 having delay line section 53 and RGB matrix manipulation section 54, and liquid crystal display module section 55 having video RAM 56, contrast/brightness adjuster 57, driving signal converter 58 and liquid crystal panel 59.

Moving picture decoder 51 outputs video signals in YCbCr format. The video signal in YCbCr format includes brightness signal Y, color-difference signal C on which time-division multiplexed are two color-difference signals (Cb and Cr), vertical sync signal VDN, horizontal sync signal HDN, and clock signal VCK used in transferring video data.

Video signal converter 52 has RGB matrix manipulation section 54 that converts video signals in YCbCr format into LCD_R, LCD_G and LCD_B in RGB format using brightness signal Y and color-difference signal C, and delay line section 53 that adds a delay equivalent to RGB matrix manipulation section 54 to vertical sync signal VDN and horizontal sync signal HDN output from moving picture decoder 51, and outputs vertical sync signal VSYNCN and horizontal sync signal HSYNCN to liquid crystal display module section 55.

Liquid crystal display module section 55 has video RAM 56 that temporarily stores a video signal in RGB format output from video signal converter 52, contrast/brightness adjuster 57 that adjusts a dynamic range and offset amount of the video signal in RGB format read from video RAM 56, driving signal converter 58 that generates a driving signal for driving liquid crystal panel 59 from vertical sync signal VSYNCN and horizontal sync signal HSYNCN output from video signal converter 52 and R'G'B' signal output from contrast/brightness adjuster 57, and liquid crystal panel 59 that displays moving pictures corresponding to the driving signal.

Figure 2:
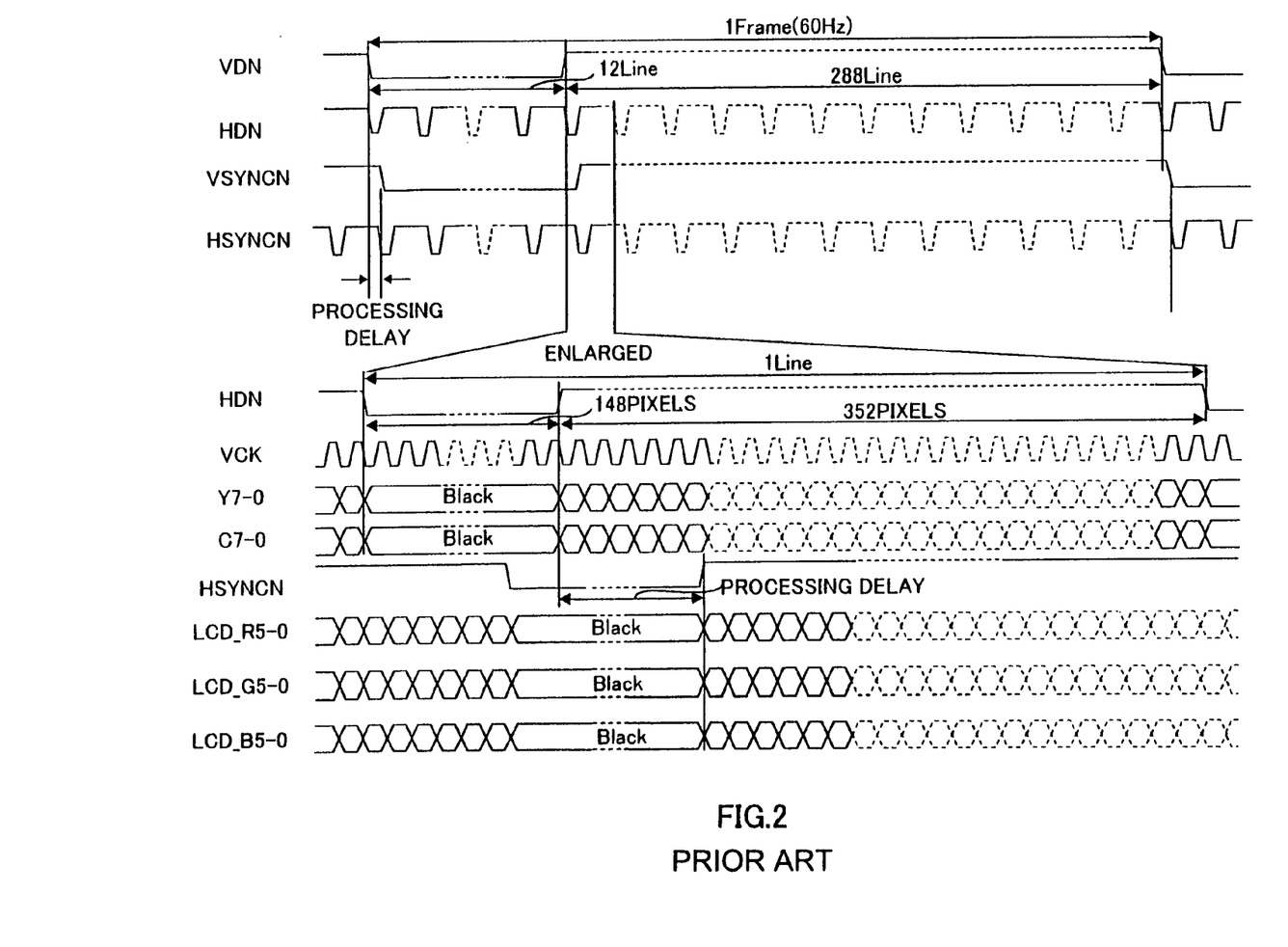
FIG. 2 is a timing diagram of input and output signals in a video signal converter in the conventional moving picture decoding display apparatus.
Figure 3A:
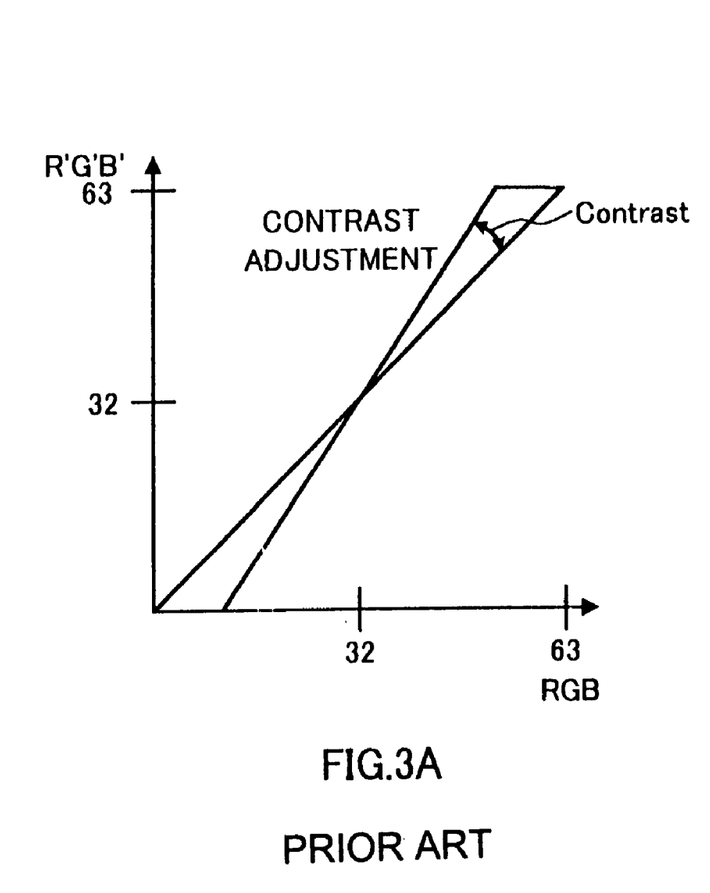
FIG. 3A shows a graph illustrating input/output characteristics to explain the processing in a contrast/brightness adjuster in the conventional moving picture decoding display apparatus.
Figure 3B:
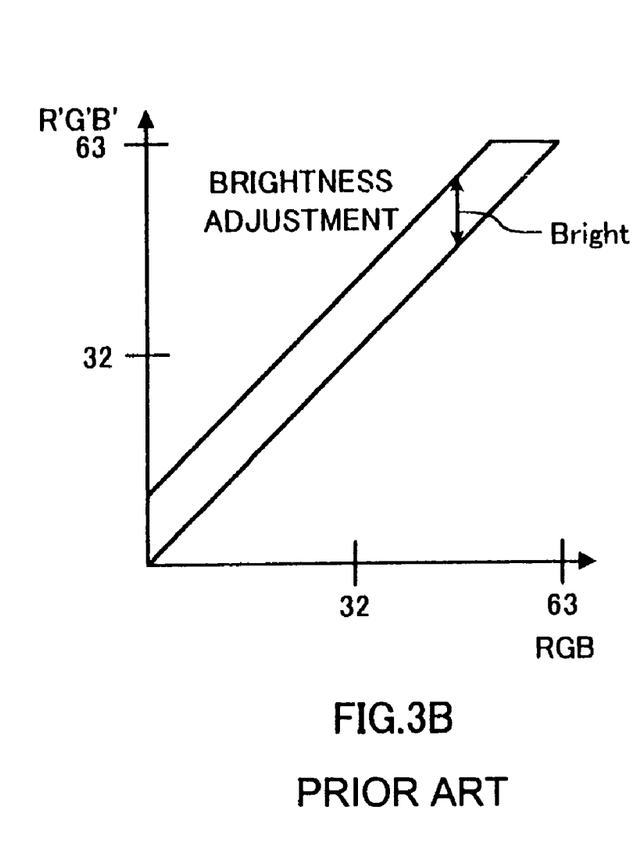
FIG. 3B shows another graph illustrating input/output characteristics to explain the processing in the contrast/brightness adjuster in the conventional moving picture decoding display apparatus.
Figure 4:
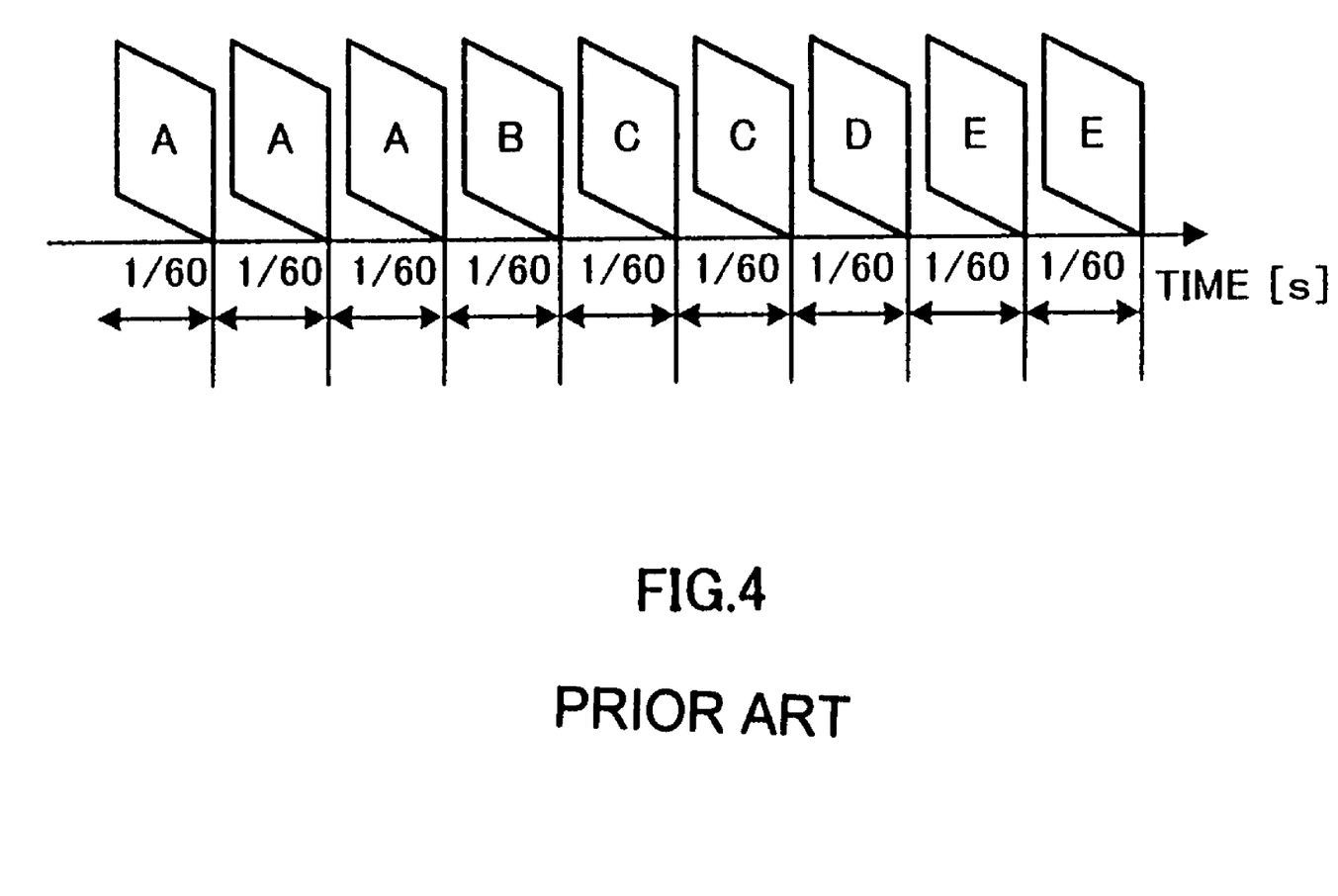
FIG. 4 is a diagram illustrating moving pictures to be displayed on a liquid crystal panel in the conventional moving picture decoding display apparatus.

The operation of moving picture decoding display apparatus 50 with the above configuration will be described with reference to FIGS. 2 to 4. FIG. 2 is a timing diagram of input and output signals in the video signal converter in the conventional moving picture decoding display apparatus, FIG. 3 shows graphs illustrating input/output characteristics to explain the processing in the contrast/brightness adjuster, and FIG. 4 is a diagram illustrating moving pictures to be displayed on the liquid crystal panel.

Moving picture decoder 51 outputs to video signal converter 52, as shown in FIG. 2, as moving-picture video signals, vertical sync signal VDN, horizontal sync signal HDN, brightness signal Y (8 bits) and color-difference signal C (8 bits) with time-division multiplexed two color-difference signals (Cb and Cr), in synchronization with a falling edge of clock signal VCK.

Moving picture decoder 51 inputs brightness signal Y and color-difference signal C to RGB matrix manipulation section 54. In the video signal in CIF4:2:2 format, as shown in FIG. 2, two color-difference components, i.e., Cb and Cr are time-divided. A color-difference component of an odd-numbered pixel number is interpolated by a color difference of an even-numbered pixel number, converted into the signal in RGB format, and output as signal LCD_R, LCD_G and LCD_B. Specifically, the section 54 calculates as described below.

LCD_R=Y+1.402*Cr
LCD_G=Y−0.344*Cb−0.714×Cr
LCD_B=Y+1.772*Cb

Herein, it is assumed that each has 6 bits.

Meanwhile, moving picture decoder 51 inputs vertical sync signal VDN and horizontal sync signal HDN to delay line section 53. Delay line section 53 adds a processing delay of RGB matrix manipulation section 54 to the input signals, and outputs vertical sync signal VSYNCN and horizontal sync signal HSYNCN to liquid crystal display module section 55.

Liquid crystal display module section 55 temporarily stores provided video signals LCD_R, LCD_G and LCD_B in video RAM 56 every rising edge of VCK. Video RAM 56 reads out the signals as R, G and B to output to contrast/brightness adjuster 57.

The input/output characteristics that are functions of contrast/brightness adjuster 57 are expressed by Y=Contrast (X−32)+32+Brightness where an input is X and an output is y, as shown in FIG. 3. These signals are processed for each of R, G and B. When an output range is of 6 bits, since the range is from 0 to 63, the output Y exceeding the range undergoes clipping to be in the range of 0 to 63.

These characteristics can be changed with values of contrast and brightness given from the outside as parameters. The processed output signals R', G' and B' are provided to driving signal converter 58 along with vertical sync signal VSYCN and horizontal sync signal HSYNCN, and the section 58 generates a signal for driving liquid crystal panel 59 to display moving pictures.

It is generally known that liquid crystal panel 59 should drive video signals in about 60 Hz so as to suppress the flicker of displayed image. In other words, image display intervals in FIG. 4 need to be one-sixtieth seconds. In conventional moving picture decoding display apparatus 50 as described above, the video signal is output from moving picture decoder 51 at 60 Hz, and the processing in video signal converter 52 and subsequent sections is executed at 60 Hz consistently.

However, in the conventional apparatus, there are problems as described later. That is, the decoding processing in moving picture decoder 51 is dependent on its performance and handling image size, decoded image quality, coding bit rate, etc., and decoded images are not always different every 60 Hz. In other words, although images are output at a frame rate of 60 fps, some sheets of same image are provided actually. As shown in FIG. 4, image frames with the same contents, for example, three sheets of image A and two sheets of image C, are present. The actual frame rate in portable video telephones is estimated at approximately 15 fps. The processing at 60 Hz is required for reading data from video RAM 56 and thereafter, and the processing at 60 Hz in video signal converter 52 disposed before video RAM 56 results in current dissipation.

Further, contrast/brightness adjuster 57 disposed after video RAM 56 also executes processing at 60 Hz always, resulting in disadvantages in current consumption.

DISCLOSURE OF INVENTION

It is an object of the present invention to provide a moving picture decoding display apparatus and moving picture decoding display method that switch on and off the operation of required video signal processing based on an actual frame rate, and thereby are capable of suppressing power consumption in the entire apparatus.

The object is achieved by displaying moving pictures using video signals subjected to RGB format conversion and contrast/brightness adjustment when the video contents change, while displaying videos using video signals stored in a video RAM which are not subjected to the RGB format conversion and contrast/brightness adjustment when the video contents do not change.

BEST MODE FOR CARRYING OUT THE INVENTION

Embodiments of the present invention will be described below with reference to accompanying drawings.

(First Embodiment)

Figure 5:
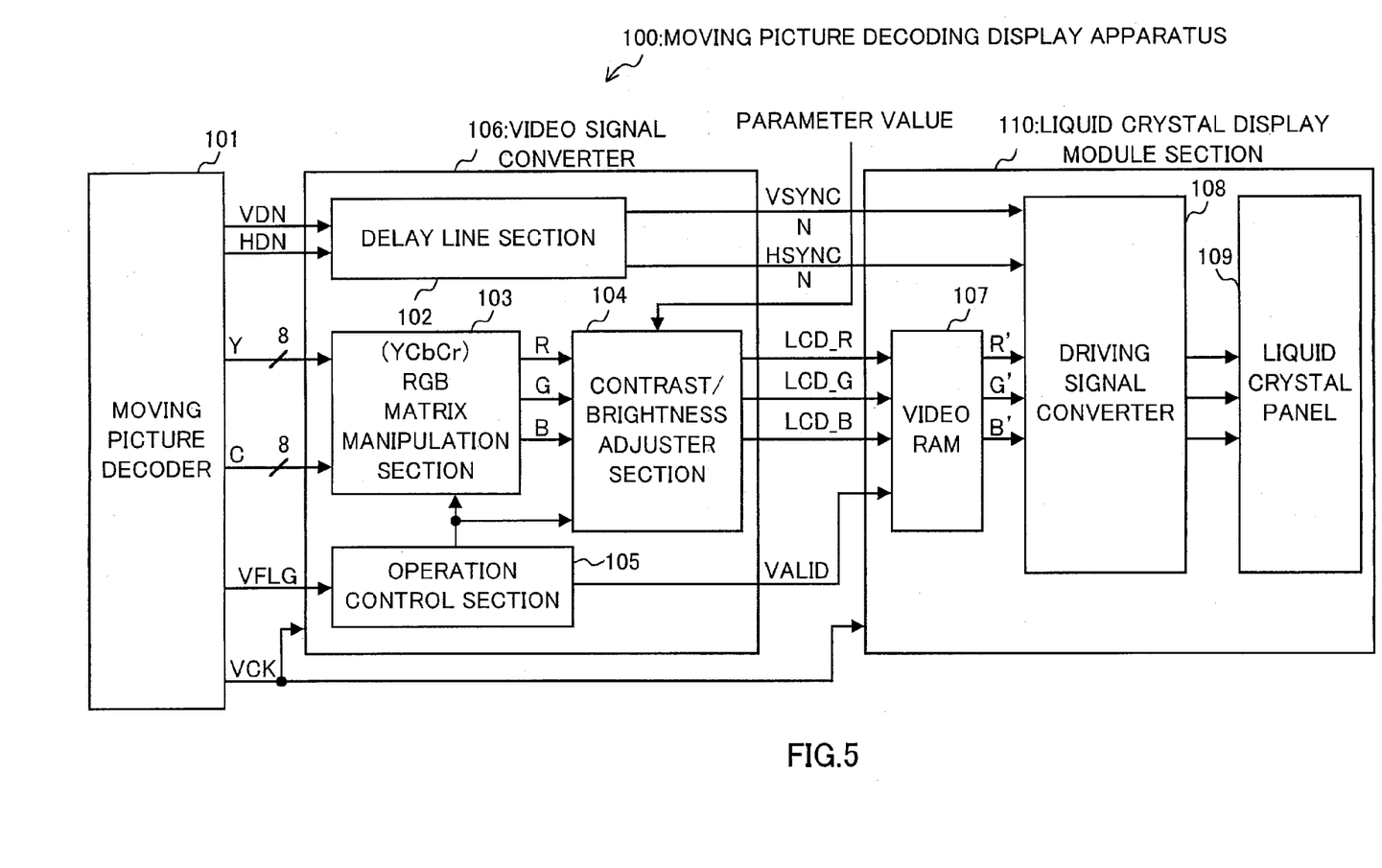
FIG. 5 is a block diagram illustrating a configuration of a moving picture decoding display apparatus according to a first embodiment of the present invention.

FIG. 5 is a block diagram illustrating a configuration of a moving picture decoding display apparatus according to a first embodiment of the present invention.

Moving picture decoding display apparatus 100 illustrated in FIG. 5 is provided with moving picture decoder 101, video signal converter 106 having delay line section 102, RGB matrix manipulation section 103, contrast/brightness adjusting section 104, and operation control section 105, and liquid crystal display module section 110 having video RAM 107, driving signal converter 108 and liquid crystal panel 109.

Moving picture decoder 101 outputs to video signal converter 106 a video signal for displaying moving pictures in YCbCr format composed of brightness signal Y and color-difference signal C on which time-division multiplexed are two color-difference signals (Cb and Cr), vertical sync signal VDN, horizontal sync signal HDN, video signal transfer clock signal VCK, and VFLG indicating that a video signal is updated from a last frame.

RGB matrix manipulation section 103 converts the video signal in YCbCr format into a video signal in RGB format.

Contrast/brightness adjusting section 104 adjusts the contrast and brightness of each input signal in RGB format.

Operation control section 105 receives video signal update signal VHLG from moving picture decoder 101, switches on or off the operation of RGB matrix manipulation section 103 and contrast/brightness adjusting section 104, and outputs video update signal VALID to liquid crystal display module section 110.

Delay line section 102 adds a processing delay of RGB matrix manipulation section 103 and contrast/brightness adjusting section 104 to vertical sync signal VDN and horizontal sync signal HDN from moving picture decoder 101, and outputs vertical sync signal VSYNCN and horizontal sync signal HSYNCN to liquid crystal display module section 110.

Video RAM 107 temporarily stores video signals LCD_R, LCD_G and LCD_B in RGB format output from video signal converter 106.

Driving signal converter 108 generates a driving signal for the liquid crystal panel from videos signals R', G' and B' in RGB format read from vide RAM 107, and vertical sync signal VSYNCN and horizontal sync signal HSYNCN output from video signal converter 106.

Liquid crystal panel 109 displays moving pictures corresponding to the driving signal.

Figure 6:
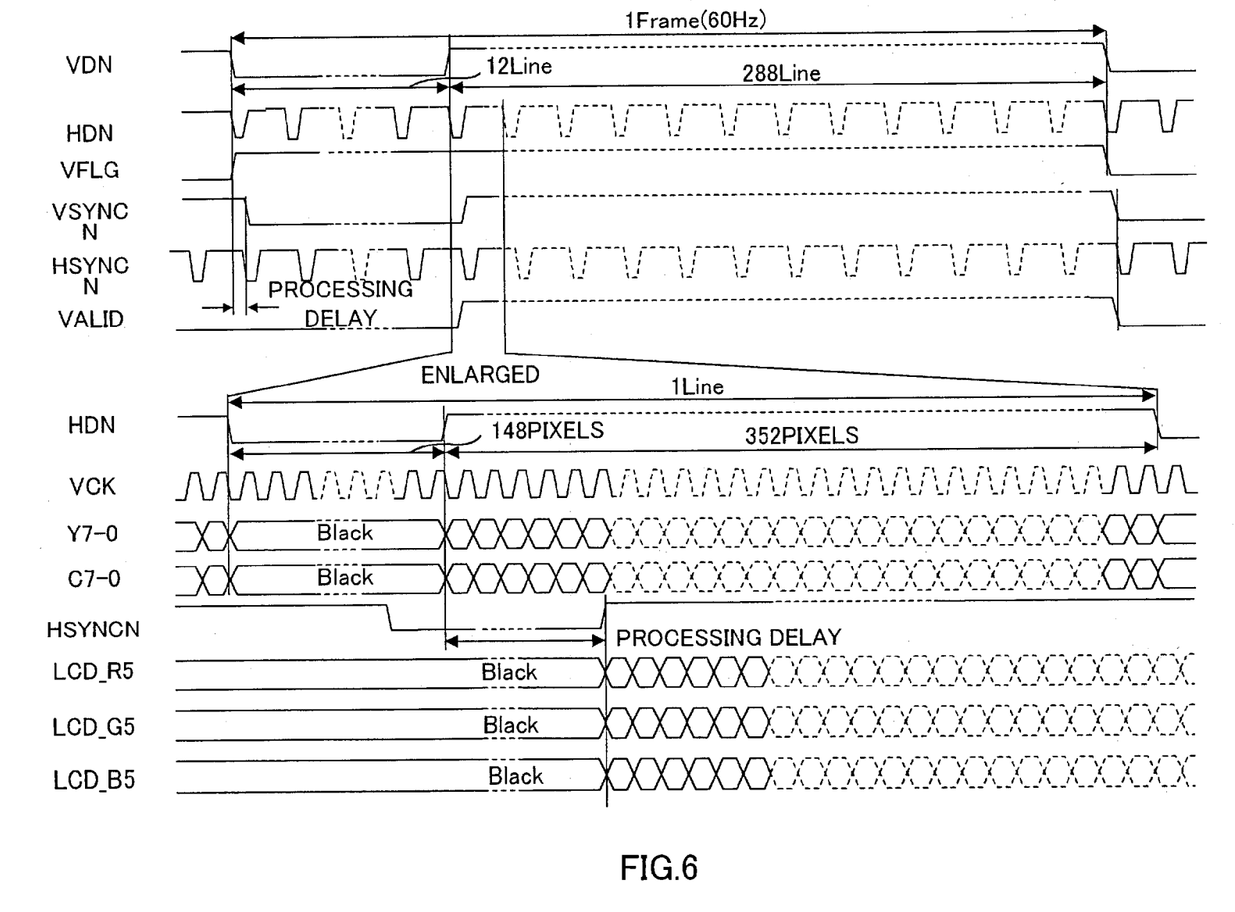
FIG. 6 is a timing diagram of input and output signals in a video signal converter in the moving picture decoding display apparatus according to the first embodiment.
Figure 7:
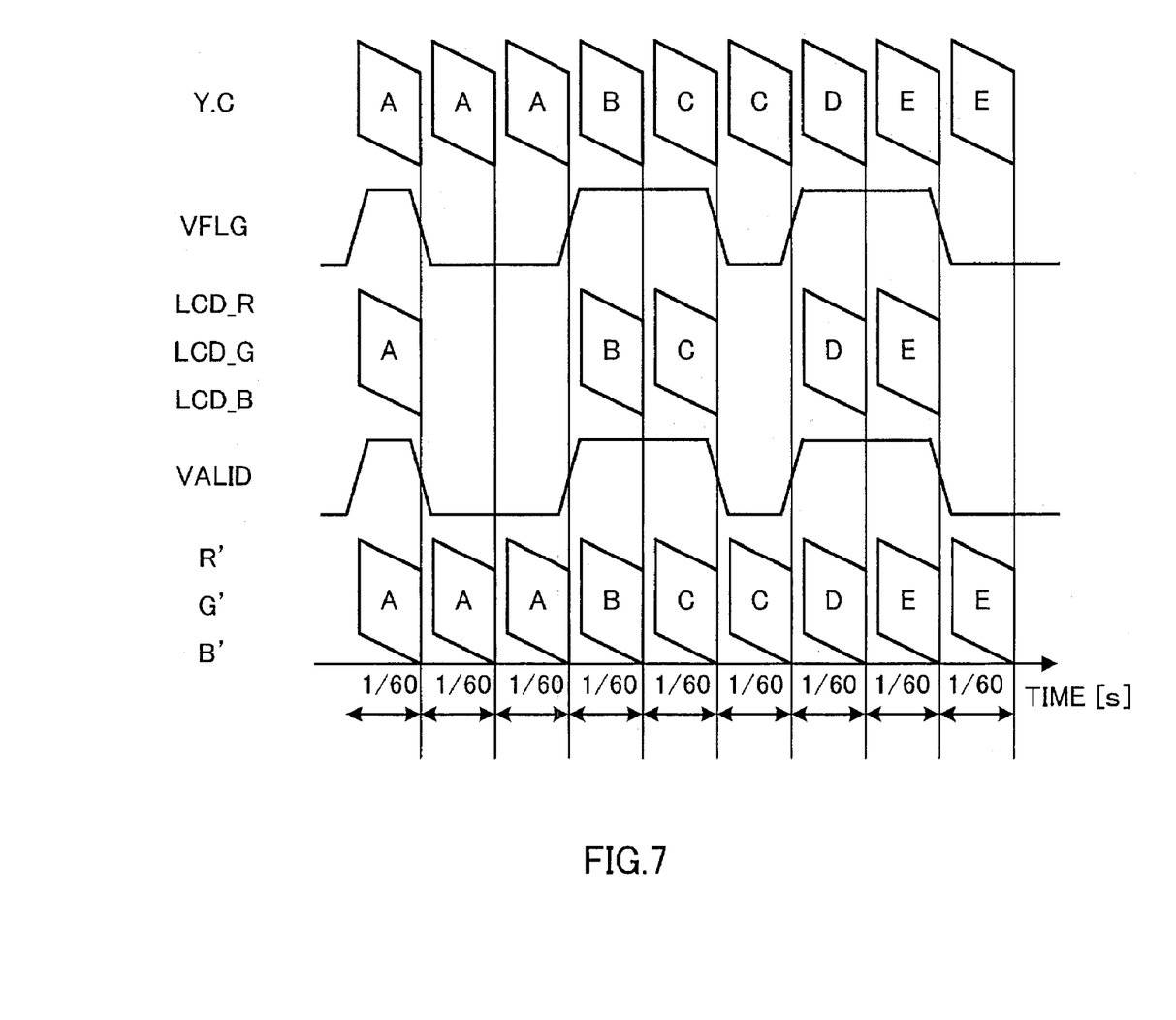
FIG. 7 is a diagram illustrating moving pictures output from a moving picture decoder to be displayed on a liquid crystal panel in the moving picture decoding display apparatus according to the first embodiment.

The operation of moving picture decoding display apparatus 100 with the above configuration will be described with reference to FIGS. 6 and 7. FIG. 6 is a timing diagram of input and output signals in video signal converter 106, and FIG. 7 is a diagram illustrating moving pictures output from moving picture decoder 101 to be displayed on liquid crystal panel 109.

Moving picture decoder 101 outputs to video signal converter 106, as shown in FIG. 6, vertical sync signal VDN, horizontal sync signal HDN, brightness signal Y (8 bits) of decoded moving picture, color-difference signal C (8 bits) with time-division multiplexed two color-difference components (Cb and Cr), and a signal VFLG indicative of outputting an image different from that of a last frame, in synchronization with a falling edge of clock signal VCK. In addition, VFLG (frame Valid FLaG) is generated to indicate that memory contents have been updated when image data is written in a frame memory of the moving picture decoder or the contents are read out.

In this example, signal VFLG of 1 indicates that a current moving picture is different from that of a last frame, while the signal of 0 indicates that a current moving picture is the same as that of a last frame. In video signal converter 106, corresponding to logic 0/1 of signal VFLG, operation control section 105 generates a control signal for controlling ON and OFF of the operation of RGB matrix manipulation section 103 and contrast/brightness adjusting section 104, and signal VALID for notifying that the contents of an image has been changed to liquid crystal display module section 110.

The section 105 switches on the operation of RGB matrix manipulation section 103 and contrast/brightness adjusting section 104 when signal VFLG is 1, while switching off the operation when signal VFLG is 0.

Corresponding to the control signal from operation control section 105, when the operation is switched on, RGB matrix manipulation section 103 generates video signals R, G and B in RGB format from brightness signal Y and color-difference signal C. Specifically, the section 103 calculates as described below, and may be composed of a multiplier and adder, or a ROM storing a conversion table.

R=Y+1.402×Cr
G=Y−0.344×Cb−0.714×Cr
B=Y+1.772×Cr

When the operation of the section 103 is switched off, the supply of operation clock is stopped and so on, thereby reducing power consumption. Corresponding to the control signal from operation control section 105, when the operation is switched on, contrast/brightness adjusting section 104 executes the processing based on following equations.

LCD_R=Contrast*(R−32)+Brightness+32
LCD_G=Contrast*(G−32)+Brightness+32
LCD_B=Contrast*(−32)+Brightness+32

The contrast and brightness is provided from the outside as parameters. These parameter values are sometimes provided for each of R, G and B independently. When the operation is switched off, the section 104 outputs "black" (all bits are 0) and stops outputting.

Moving picture decoder 101 inputs vertical sync signal VDN and horizontal sync signal HDN to delay line section 102. Delay line section 102 adds a processing delay of RGB matrix manipulation section 103 and contrast/brightness adjusting section 104 to the input signals, and outputs vertical sync signal VSYNCN and horizontal sync signal HSYNCN to liquid crystal display module section 110.

Liquid crystal display module section 110 temporarily stores provided video signals LCD_R, LCD_G and LCD_B in video RAM 107 every rising edge of VCK only when signal VALID is 1, while not storing the signals in video RAM 107 when signal VALID is 0. Signals LCD_R, LCD_G and LCD_B stored in video RAM 107 are read out as signals R', G' and B' always at 60 fps and is output to driving signal converter 108.

Driving signal converter 108 generates a driving signal for driving liquid crystal panel 109 from vertical sync signal VSYNCN, horizontal sync signal HSYNCN and signals R', G', and B', so that moving pictures are displayed on liquid crystal panel 109.

FIG. 7 shows moving pictures output from moving picture decoder 101 to be displayed on liquid crystal panel 109 in the above description. Brightness signal Y and color-difference signal C output from moving picture decoder 101 are dependent on its performance and handling image size, decoded image quality, coding bit rate, etc., and decoded pictures are not always different every 60 Hz.

As an example in FIG. 7, image frames with the same contents, for example, three sheets of image A, one sheet of image B and two sheets of image B, are continued. Using signal VFLG, video signal converter 106 outputs video signals LCD_R, LCD_G and LCD_B only when the contents of an image are changed. Video signals R', G' and B' actually indicated on liquid crystal panel 109 are displayed in the same way as in the video signals provided from moving picture decoder 101.

Thus, according to moving picture decoding display apparatus 100 of this embodiment, in accordance with the substantial frame rate, only when the image contents are changed, RGB format conversion and contrast/brightness adjustment is executed, and it is thereby possible to reduce power consumption in RGB matrix manipulation section 103 and contrast/brightness adjusting section 104.

(Second Embodiment)

Figure 8:
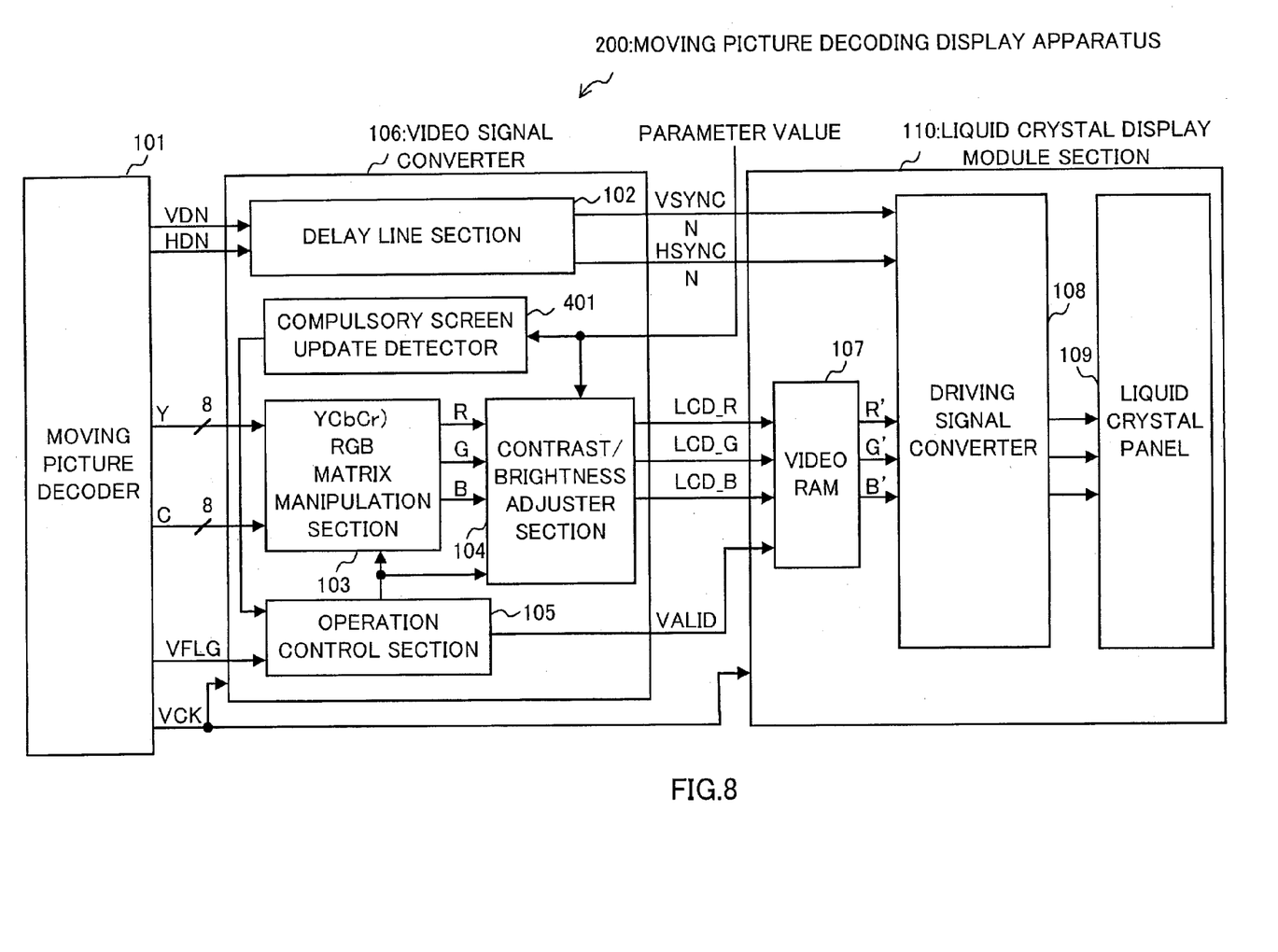
FIG. 8 is a block diagram illustrating a configuration of a moving picture decoding display apparatus according to a second embodiment of the present invention.

FIG. 8 is a block diagram illustrating a configuration of a moving picture decoding display apparatus according to the second embodiment of the present invention. In addition, in the second embodiment illustrated in FIG. 8, sections similar to those in FIG. 5 are assigned the same reference numerals to omit descriptions thereof.

Moving picture decoding display apparatus 200 illustrated in FIG. 8 is different from moving picture decoding display apparatus 100 illustrated in FIG. 5 in respects that video signal converter 106 has compulsory screen update detector 401, and operation control section 105 performs the control operation as described below.

The parameter value provided to contrast/brightness adjusting section 104 from the outside is also input to compulsory screen update detector 401. Compulsory screen update detector 401 determines whether or not the parameter value has been updated from an already set value. For example, the section 401 outputs "1" when the value is update, while outputting "0" when the value is not update, to operation control section 105.

When signal VFLG from moving picture decoder 101 is "1" indicating that the moving picture is updated, or the signal from compulsory screen update detector 401 is "1" indicating that the parameter value is updated, operation control section 105 switches on the operation of RGB matrix manipulation section 103 and contrast/brightness adjusting section 104, and sets signal VALID at "1" to notify that the image contents are changed to liquid crystal display module section 110. When signal VFLG is "0" and the signal indicating whether the parameter value is updated is "0", the section 105 switches off the operation of RGB matrix manipulation section 103 and contrast/brightness adjusting section 104, and sets signal VALID at "0".

Figure 9:
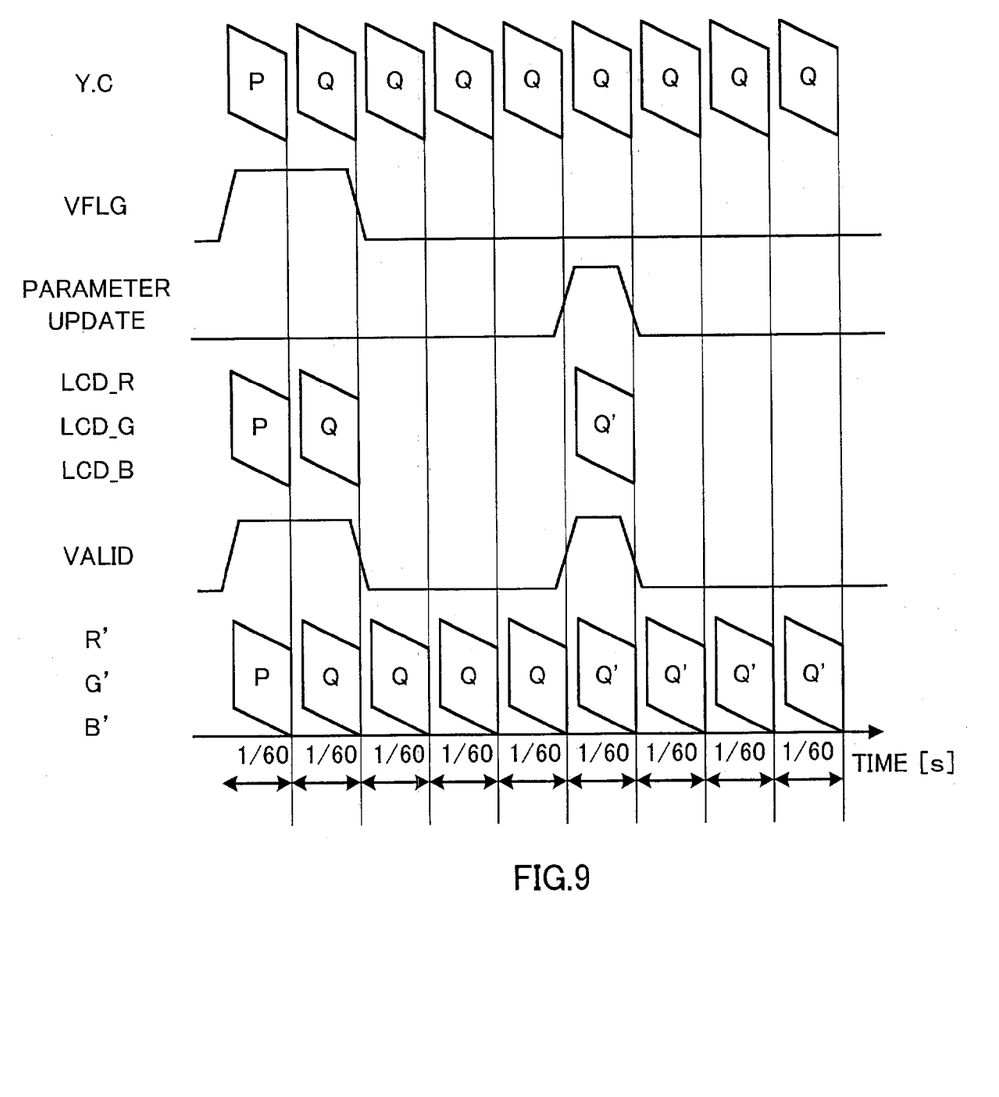
FIG. 9 is a diagram illustrating moving pictures output from a moving picture decoder to be displayed on a liquid crystal panel in the moving picture decoding display apparatus according to the second embodiment.

FIG. 9 is a diagram illustrating moving pictures output from moving picture decoder 101 to be displayed on liquid crystal panel 109. Even when the moving picture output from moving picture decoder 101 is stopped in Q, once the parameter value is updated as described above, with the updated value reflected, image Q' subjected to the processing in contrast/brightness section 104 is displayed on liquid crystal panel 109.

Thus, according to moving picture decoding display apparatus 200 of the second embodiment, in accordance with the substantial frame rate, when the image contents are changed, RGB format conversion and contrast/brightness adjustment is executed, and it is thereby possible to reduce power consumption in RGB matrix manipulation section 103 and contrast/brightness adjusting section 104.

Further, when the parameter value for contrast/brightness adjusting section 104 is changed, it is possible to immediately display the picture in which the change is reflected.

As described above, according to the present invention, the operation of required video signal processing is switched on or off based on an actual frame rate, and it is thereby possible to suppress the power consumption in the entire apparatus.

This application is based on the Japanese Patent Application No. 2001-067308 filed on Mar. 9, 2001, entire content of which is expressly incorporated by reference herein.

INDUSTRIAL APPLICABILITY

The present invention is suitable for use in a moving picture decoding display apparatus and moving picture decoding display method which are installed onto a mobile station apparatus such as a cellular telephone or an information communication terminal apparatus provided with functions of communications and computer in a mobile communication system, and which convert video signals including brightness signal Y and color-difference signals Cb and Cr from a moving picture decoder into video signals in primary-color signal format composed of R (Red), G (Green) and B (Blue) to display moving pictures.

The invention claimed is:

1. A moving picture decoding display apparatus comprising:
    a decoder that decodes a moving picture signal and outputs a video signal in YCbCr format;
    a converter that converts the video signal in YCbCr format output from the decoder, into RGB format;
    an adjuster that adjusts contrast and brightness of the video signal converted in the converter into RGB format, according to parameter values input from outside;
    a detector that detects an update in the parameter values;
    a controller that operates the converter and the adjuster in response to an input signal that represents an update in the video signal with respect to a previous frame or in response to detection by said detector of an update in the parameter values; and
    a display that displays the video signal adjusted in the adjuster.

2. The moving picture decoding display apparatus according to claim 1, further comprising:
    a memory that stores the video signal after the adjustment of contrast and brightness in the adjuster, wherein:
    when the converter and the adjuster are in operation, the controller executes control such that the video signal after the adjustment in the adjuster is stored in the memory.

3. A mobile station apparatus comprising the moving picture decoding display apparatus of claim 1.

4. A moving picture decoding display method comprising:
    decoding a moving picture signal and outputting a video signal in YCbCr format;
    converting the video signal in YCbCr format into RGB format;
    adjusting contrast and brightness of the video signal converted into RGB format, according to parameter values input from outside;
    detecting an update in the parameter values;
    executing control such that the conversion and adjustment processing is performed in response to input of a signal that represents an update in the video signal with respect to a previous frame or in response to detection of an update in the parameter values; and
    displaying the video signal after the adjustment.

5. The moving picture decoding display method according to claim 4, further comprising executing control to temporarily store the video signal, adjusted in the adjusting step, in the memory and displaying the temporarily stored video signal.

* * * * *